(12) United States Patent
Ramakrishnan et al.

(10) Patent No.: US 9,262,553 B2
(45) Date of Patent: *Feb. 16, 2016

(54) USER-POWERED RECOMMENDATION SYSTEM

(71) Applicants: AT&T Intellectual Property I, L.P., Atlanta, GA (US); Board of Regents, The University of Texas System, Austin, TX (US)

(72) Inventors: Kadangode K. Ramakrishnan, Berkeley Heights, NJ (US); Divesh Srivastava, Summit, NJ (US); Tae Won Cho, Jersey City, NJ (US); Yin Zhang, Austin, TX (US)

(73) Assignees: AT&T Intellectual Property I, L.P., Atlanta, GA (US); Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,113

(22) Filed: Dec. 11, 2014

(65) Prior Publication Data

US 2015/0100599 A1     Apr. 9, 2015

Related U.S. Application Data

(63) Continuation of application No. 12/616,892, filed on Nov. 12, 2009, now Pat. No. 8,943,081.

(60) Provisional application No. 61/199,490, filed on Nov. 17, 2008.

(51) Int. Cl.
*G06F 17/30* (2006.01)
*G11B 27/10* (2006.01)
(Continued)

(52) U.S. Cl.
CPC ...... *G06F 17/3097* (2013.01); *G06F 17/30038* (2013.01); *G06F 17/30412* (2013.01);
(Continued)

(58) Field of Classification Search
CPC .......... H04N 21/4661; H04N 21/4668; H04N 21/4756
USPC ........................................................ 707/758
See application file for complete search history.

(56) References Cited

U.S. PATENT DOCUMENTS 6,853,982 B2   2/2005   Smith et al.
7,584,171 B2   9/2009   Guan et al.
(Continued)

OTHER PUBLICATIONS

G. Cormode, F. Korn, S. Muthukrishnan, and D. Srivastava. Finding hierarchical heavy hitters in data streams. In VLDB, 2003.
(Continued)

*Primary Examiner* — Mahesh Dwivedi
(74) *Attorney, Agent, or Firm* — Chiesa Shahinian & Giantomasi PC

(57) ABSTRACT

Recommendation systems are widely used in Internet applications. In current recommendation systems, users only play a passive role and have limited control over the recommendation generation process. As a result, there is often considerable mismatch between the recommendations made by these systems and the actual user interests, which are fine-grained and constantly evolving. With a user-powered distributed recommendation architecture, individual users can flexibly define fine-grained communities of interest in a declarative fashion and obtain recommendations accurately tailored to their interests by aggregating opinions of users in such communities. By combining a progressive sampling technique with data perturbation methods, the recommendation system is both scalable and privacy-preserving.

20 Claims, 9 Drawing Sheets

(51) Int. Cl.
*H04N 21/475* (2011.01)
*H04N 21/466* (2011.01)

(52) U.S. Cl.
CPC .......... *G11B27/105* (2013.01); *H04N 21/4661* (2013.01); *H04N 21/4668* (2013.01); *H04N 21/4756* (2013.01)

(56) References Cited

U.S. PATENT DOCUMENTS

| | | | |
|---|---|---|---|
| 7,590,562 | B2 | 9/2009 | Stoppelman |
| 7,590,616 | B2 | 9/2009 | Guan et al. |
| 7,593,921 | B2 | 9/2009 | Goronzy et al. |
| 7,594,244 | B2 | 9/2009 | Scholl et al. |
| 7,860,925 | B1 * | 12/2010 | Gheorghe et al. ............ 709/203 |
| 7,895,625 | B1 | 2/2011 | Bryan et al. |
| 2008/0031280 | A1 | 2/2008 | Georgis et al. |
| 2008/0178239 | A1 | 7/2008 | Yampanis |
| 2008/0294617 | A1 | 11/2008 | Chakrabarti et al. |
| 2009/0164442 | A1 | 6/2009 | Shani et al. |
| 2010/0057778 | A1 | 3/2010 | Fein et al. |
| 2010/0094866 | A1 | 4/2010 | Cuttner et al. |

OTHER PUBLICATIONS

D. Frankowski, D. Cosley, S. Sen, L. Terveen, and J. Riedl. You are what you say: Privacy risks of public mentions. In SIGIR, 2006.
H. Polat and W. Du. Privacy-preserving collaborative filtering using randomized perturbation techniques. In ICDM, 2003.
H. Polat and W. Du. Privacy-preserving top-n recommendation on distributed data. Journal of American Society for Information Science & Technology, 2008.
Elomaa, et al., "Progressive Rademacher Sampling", 2002.
Gu, et al., "Efficiently Determining the Starting Sample Size for Progressive Sampling", 2001.

* cited by examiner

| USER 180 | MARITAL STATUS 190 | LOCATION 1100 |
|---|---|---|
| USER-A 181 | Y 191 | Y 1101 |
| USER-B 182 | Y 192 | N 1102 |
| USER-C 183 | N 193 | Y 1103 |
| USER-D 184 | Y 194 | Y 1104 |
| USER-E 185 | Y 195 | Y 1105 |

FIG. 1A

| MOVIE 110 | GENRE 120 | USER-A RATING 130 | USER-B RATING 140 | USER-C RATING 150 | USER-D RATING 160 | USER-E RATING 170 |
|---|---|---|---|---|---|---|
| MOVIE-A 111 | GENRE-A 121 | Y 131 | Y 141 | Y 151 | Y 161 | Y 171 |
| MOVIE-B 112 | GENRE-H 122 | -- 132 | Y 142 | Y 152 | N 162 | Y 172 |
| MOVIE-C 113 | GENRE-A 123 | -- 133 | Y 143 | N 153 | Y 163 | Y 173 |
| MOVIE-D 114 | GENRE-H 124 | -- 134 | N 144 | Y 154 | Y 164 | N 174 |

FIG. 1B

| (602) | (604) | (606) | (608) | (610) | (612) | (614) | (616) | (618) | (620) | (622) | (624) |
|---|---|---|---|---|---|---|---|---|---|---|---|
| COMM | POL | FN | PN | AVG #USER | 1.5% | 3% | 6% | 12% | 25% | 50% | 100% |
| 100NN | 1 | 0.041 | 0.00029 | 26.1 | N/A | N/A | N/A | 52.3% | 30.8% | 10.1% | 7.2% |
| 100NN | 2 | 0.062 | 0.00111 | 18.6 | N/A | N/A | N/A | 73.1% | 20.2% | 3.8% | 2.9% |
| 1000NN | 1 | 0.027 | 0.00006 | 69.0 | 58.8% | 17.7% | 10.6% | 4.78% | 3.70% | 2.18% | 2.11% |
| 1000NN | 2 | 0.057 | 0.00019 | 24.2 | 81.98% | 12.29% | 3.88% | 1.16% | 0.53% | 0.098% | 0.068% |

FIG. 6

USER-POWERED RECOMMENDATION SYSTEM

This application is a continuation of U.S. patent application Ser. No. 12/616,892 filed Nov. 12, 2009, which claims the benefit of U.S. Provisional Application No. 61/199,490 filed Nov. 17, 2008, the disclosures of which are herein incorporated by reference in their entirety.

BACKGROUND

The present disclosure relates generally to recommendation systems, and more particularly to user-powered recommendation systems.

Recommendation systems are widely used on the Internet. Users rely on recommendation systems, for example, for deciding which news articles to read, which movies to watch, and which digital cameras to purchase. Recommendation systems have become popular for several reasons. Since a vast quantity of information is available on the Internet, a filtering mechanism is needed to obtain information of interest. Furthermore, many recommendations respond to requests for subjective information (for example, "What are good science-fiction movies from the 1960's?"). Therefore, it is important to identify communities of respondents that are likely to provide relevant information to the user. In answer to the above query, for example, recommendations from science-fiction fans are more likely to be relevant than recommendations from respondents with a strong distaste for the genre. Current recommendation systems typically employ collaborative filtering techniques to automatically identify communities of people on the Internet with backgrounds, interests, and tastes similar to those of the user.

If the user associates only with people having similar background, interests, and tastes, however, he may miss opportunities to expand his horizons, to explore new forms of art, food, movies, and literature. Depending on a user's particular needs at a particular instant, the most appropriate community of potential respondents may vary. What are needed are recommendation systems which allow the user to select the community of potential respondents. Recommendation systems which allow the user to select additional criteria and algorithms for outputting recommendations are advantageous.

BRIEF SUMMARY

In an embodiment, a recommendation system receives a user-defined recommendation request and a user-defined declarative community definition. The recommendation system searches at least one recommendation database. The recommendation system retrieves rating data from at least one member of the community defined by the declarative community definition. Based at least in part on the rating data, the recommendation system generates at least one recommendation.

In an embodiment, the recommendation system receives additional user input, including a user-defined item constraint, a user-defined aggregation function, and a user-defined selection algorithm. The recommendation system generates at least one recommendation according to the aggregation function and a progressive sampling policy. To preserve privacy, the rating data may be perturbed.

These and other advantages of the disclosure will be apparent to those of ordinary skill in the art by reference to the following detailed description and the accompanying drawings.

BRIEF DESCRIPTION OF THE DRAWINGS

FIG. 1A and FIG. 1B show examples of user profiles and user recommendations;

FIG. 6 shows a summary of progressive sampling results;

DETAILED DESCRIPTION

Figure 2:
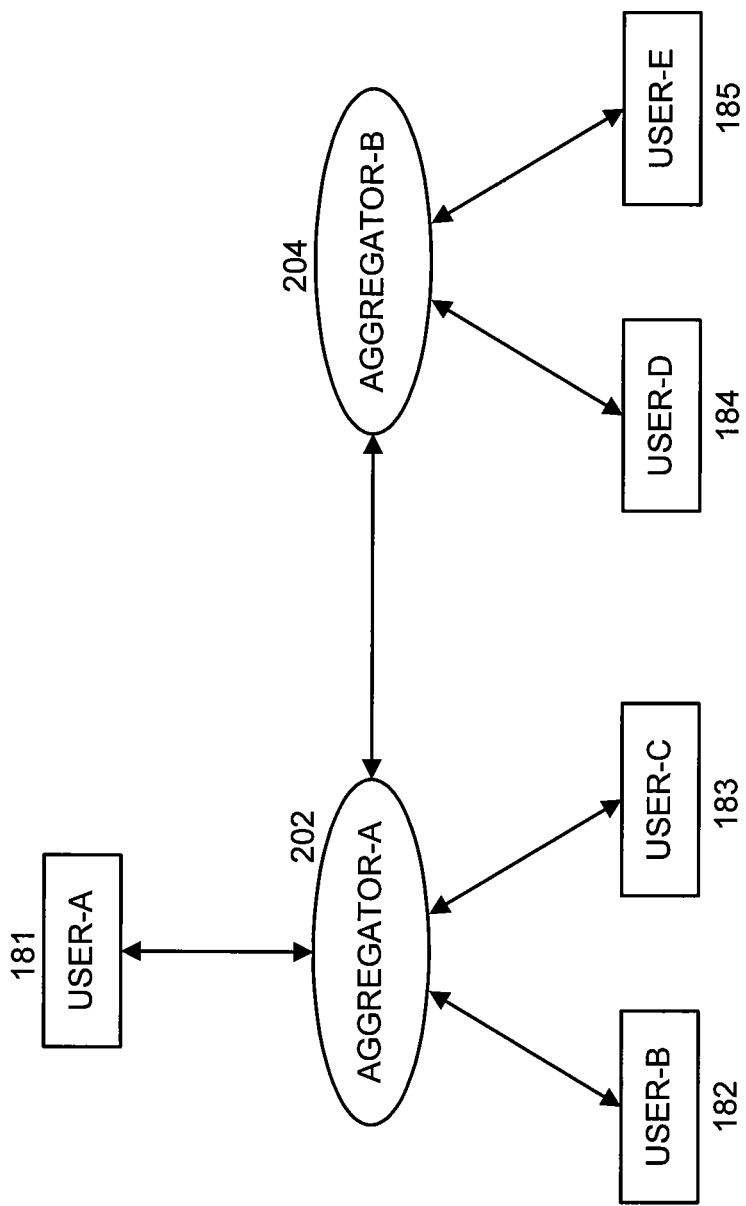
FIG. 2 shows a schematic of an aggregation system.

A request for movie recommendations is used to illustrate the operation of an on-line recommendation system. FIG. 1A shows a table listing the user profiles of a number of users of the recommendation system. Column 180 lists the names of the users, user-A 181-user-E 185. Column 190 indicates their corresponding marital status, marital status 191-marital status 195, respectively. The values for the marital status attribute are "Y"="single" and "N"="married". Column 1100 indicates their corresponding location, location 1101-location 1105. The values for the location attribute are, for example, "Y"="New York City (NYC)" and "N"="Not in NYC".

FIG. 1B shows a table summarizing movie recommendations, based on a request for recommendation submitted by user-A 181. Column 110 lists five movies under consideration, movie-A 111-movie-D 114. Column 120 lists their respective genres, genre 121-genre 124. Here, genre-A refers to an action movie, and genre-H refers to a horror movie. Column 130 lists the ratings from user-A 181 for movie-A 111-movie-D 114, respectively. The values for the rating attribute are "Y"="good", "N"="bad", and "-"="not rated yet". Similarly, column 140 contains rating 141-rating 144 from user-B 182; column 150 contains rating 151-rating 154 from user-C 183; column 160 contains rating 161-rating 164 from user-D 184; and column 170 contains rating 171-rating 174 from user-E 185.

In this example, user-A 181 is single, living in NYC, and likes movie-A 111. In one procedure, the recommendation system first searches for other users who like movie-A 111. The target population of respondents is initially all users of the recommendation system. In this example, the recommendation system identifies user-B 182-user-E 185 as users who like movie-A 111. The recommendation system then recommends movie-B 112 because it has received the highest number (three) of Y ratings from user-B 182-user-E 185.

In another procedure, user-A 181 builds a community with a combination of user attributes. User-A 181 narrows the target population of respondents by limiting the search to users constrained to the attributes (single AND NYC). The recommendation system then identifies user-D 184 and user-E 185 as users who satisfy the criteria (single AND NYC). The recommendation system then recommends movie-C 113 because it received a Y rating from both user-D 184 and user-E 185; whereas, movie-B 112 and movie-D 114 received only a single Y rating each.

User-A 181 may also specify the type of recommended items by specifying item attributes. For example, user-A 181 is interested in horror movies popular among NYC residents.

The constraint of target items becomes (genre=horror), and the target population of respondents becomes (location=NYC). The recommendation system then recommends the horror movies movie-B 112 and movie-D 114 because they both received two Y ratings from the three NYC residents (user-C 183, user-D 184, and user-E 185).

User-A 181 may also define additional criteria for selecting the recommendations. For example, user-A 181 is interested in popular movies among singles living in NYC. During weekdays, user-A 181 wants to receive only one movie recommendation. But, for weekends, user-A 181 wants to receive all the popular movies that were well rated by more than half of the singles in NYC. The constraint on generating recommendations then may be expressed as (top=1) on weekdays, and (popularity ≥50%) on weekends. On a weekday, the recommendation system recommends movie-C 113. On a weekend, the recommendation system recommends movie-B 112, movie-C 113, and movie-D 114.

User-A 181 may also prefer a specific recommendation algorithm. For example, user-A 181 is satisfied with movie recommendations from siteA, but does not like book recommendations from siteB, where siteA and siteB refer to specific web sites providing recommendations. That is, the recommendation algorithm used by siteA for recommending movies provides more satisfactory results than the recommendation algorithm used by siteB for recommending books. User-A 181 wants instead to specify the same algorithm used by siteA for movie recommendations to get book recommendations from siteB, based on the constraints and criteria specified by user-A 181.

An important aspect of recommendation systems is preservation of privacy. A potential privacy risk exists in typical recommendation systems, since personal details of the user are entered into the recommendation system. A recommendation system that explicitly addresses the need to preserve the privacy of user information is advantageous.

In an embodiment, a recommendation system provides the features of community definition, item constraints, aggregation, algorithm selection, and privacy preservation. Each of these features are described in more detail below.

Declarative Community Definition.

A user provides user information in a user profile. Examples of user information include demographic information (for example, "NYC resident") and ratings about items (for example, rating of a specific movie). The user information is entered as user attributes. The number of user attributes changes dynamically; for example, the number of user attributes increase dynamically as the user rates more items.

A user can dynamically define a community by imposing constraints on the target population of respondents. The community is defined by specifying a set of user attributes. For example, consider a user with the attributes of "NYC resident" and "single" in his user profile. A user can declare the community of singles living in NYC by combining the two attributes (NYC resident AND single). User attributes fall into three categories: static attributes (such as gender, region, and ethnicity); dynamic attributes (such as item ratings); and content descriptors (such as item attributes).

The user community is declaratively defined by a predicate P on user attributes. To maximize expressiveness of users, the definition of a "predicate" is recursive: a predicate is either an atomic predicate or an expression using the Boolean operators AND/OR/NOT on some predicates. Expressiveness refers to the degree to which a user may specify the community. An atomic predicate can be any Boolean function on the user attributes. There are four types of predicates specified by the following conditions:

Atomic predicate: Predicate P is true iff an attribute is present in a user's attributes.

Similarity thresholding: P specifies an attribute vector (for example, a rating list) and a threshold. P is true iff the similarity between the attribute vector in P and a user's attributes (also in the form of a vector) exceeds the threshold (given in P).

Linear classifier: P specifies an attribute scoring function (that maps each attribute to a score) and a threshold. P is true iff the sum of scores associated with all the attributes that are present in a user's attribute vector exceeds the threshold (for example, using a Naive Bayes algorithm).

General classifier: A general classifier such as a decision tree, a rule, or Support Vector Machine can be applied on the user attribute vector.

In the previous example shown in FIG. 1A, the atomic predicate P:(attribute=single) forms a community of user-A 181, user-B 182, user-D 184, and user-E 185. When user-B 182 defines a community with a similarity threshold (threshold=0.9), user-E 185 becomes the only member of the community (Jaccard similarity of 1.0). Jaccard similarity refers to the intersection of two user ratings over the union of the two user ratings. When two ratings are exactly the same, the similarity score is 1.

To support a fine-grained declarative user community definition, indexing structures are created in advance such that the user community can be efficiently determined at run-time. An indexing structure is referred to as an atomic user set (AUS). An AUS is a function of user attributes. For example, each specific attribute can become one AUS (that is, all users with the specific attribute are members of the AUS).

An AUS can be created in several ways:

Attribute-based AUS is defined as a function of user feature vectors. For example, one AUS can be created for each specific feature; that is, all users with the specific feature are part of the AUS.

User-driven AUS creation is driven by the user. For example, a book-related to on-line social network may be viewed as an AUS.

Clustering-based AUS is based on clusters of users. Users can be clustered into a fixed number of clusters based on similarity of users. For example, in MinHash clustering, the probability of two users being assigned to the same cluster is same as the similarity of the two.

In a distributed environment, users in an AUS may be reached in many ways. For example, there may be an overlay multicast tree or a native Internet Protocol (IP) multicast group spanning all users in an AUS. As another example, in the case of on-line social networks, there can be edges between users in an AUS; these users can be reached by following these edges. Edges in social networks refer to relationships among users. An example of a relationship is a friendship link between two users. By traversing edges comprising friendship links, friends of users may be reached.

For a specific user community (declaratively defined by predicate P), a superset of the specific user community can be represented as the union, intersection, or difference of atomic user sets. It is advantageous to minimize the size of the superset of users to be queried (that is, to reduce the number of users unnecessarily visited). When the network and system resources are limited, the number of AUS in the recommendation system may need to be bounded. For the attribute-based AUS, the number of AUS increases as the number of attributes in the recommendation system increases. In these instances, attribute selection is performed to select only the necessary attributes. Attribute selection is performed by discarding minor attributes that are not frequently observed in the query or by mapping multiple attributes into one attribute. Note that attribute selection is not needed for clustering-based AUS, since the number of AUS is bounded by controlling the number of clusters.

For example, referring back to the example shown in FIG. 1A and FIG. 1B, consider the user query: "What are popular movies among singles who rate movie-C positively (Y)"? The predicate P becomes [AUS (single) AND AUS (movie-C)]. The superset of users can be reached through either the AUS of AUS (single) or AUS (movie-C). The desired community subset is reached by including predicate P as part of the aggregation function (see below) such that only those users satisfying P need to respond. The query is sent to the smaller AUS [for example, AUS (movie-C)], and ratings from the subset of the AUS who match the predicate are included in the aggregation. In this example, the subset comprises user-B 182 and user-D 184.

Item Constraints.

A recommendation system recommends items to users, and users provide rating on items. Attributes describing items are referred to as item attributes (for example, the genre of a movie). A user can specify the set of items eligible for recommendations with an item filter (for example, all comedy movies or all new movies released within the past month). The item filter specifies the items eligible to be used for the recommendation.

There are two categories of filters: pre-filters and post-filters. For example, consider two requests for movie recommendations: (a) "Recommend three popular comedy movies in a community." and (b) "Recommend three popular movies in a community, and, of those three popular movies, recommend a comedy." Request (a) utilizes a pre-filter, and request (b) utilizes a post-filter. Note that there are two different definitions of popularity: topK and popularity threshold. Under the topK definition of popular items (the K most popular items, where K is an integer), applying pre-filters and post-filters to items may generate different results. In the example above, there may be no movies recommended if the "comedy" filter is applied after finding the topK movies (that is, none of the top 3 most popular movies are comedies); whereas, "top 3 most popular comedies" returns the 3 most popular comedy movies in the community (assuming at least 3 comedy movies have been rated), regardless of the overall popularity of those particular movies.

Aggregation.

To obtain a recommendation, users specify the selection criteria in the form of an aggregation function that specifies how to gather recommendations and compute recommendations. An aggregation function is computed over the attributes of all the items that a (declaratively defined) user community has rated. In one example, an aggregation function specifies the list of items that are rated positively (Y) by at least 90% of users (in a specific user community). The aggregation function $f$ is then (popularity $\geq 0.9$). In an embodiment, items from different users may be weighted differently in an aggregation query (for example, to reflect higher confidence in the movie rating from an expert, or to take into account the similarity in the taste of books between two users). The weights can be specified by the aggregation function itself as a function of user attributes. Note that an unweighted aggregation function may be considered a special case of a weighted aggregation function in which all the weights are equal. To simplify the terminology, herein, the term aggregation function refers to any user-defined aggregation function.

Since users are distributed over a network, an aggregator connects multiple users and has access to information from users. For scalability, multiple aggregators may be used in the network, with a limited number of users (viewed as a "logical region") being handled by each aggregator; these aggregators communicate with each other to access information of users in other regions. Note that the aggregator disseminates user information only in the form of a summary; individual information is not visible in the aggregated data.

An example of an aggregation procedure is shown schematically in FIG. 2. The example is based on the previous scenario discussed with reference to FIG. 1A and FIG. 1B. The recommendation system includes two aggregators, aggregator-A 202 and aggregator-B 204. Aggregators refer here to network elements; for example, an aggregator may be implemented by software on a network server. User-A 181, user-B 182, and user-C 183 communicate with aggregator-A 202. Similarly, user-D 184 and user-E 185 communicate with aggregator-B 204. Aggregator-A 202 and aggregator-B 204 communicate with each other. A user agent is co-located with each user and controls how user information is shared with the recommendation system. A user agent, for example, may be implemented by software on a user's computer.

The requester (user-A 181) issues a recommendation query q, which includes a community declaration c, an aggregation function $f$, and an item filter i to get a recommendation of popular horror movies among singles in NYC. The community declaration c specifies the community members (NYC AND single). The aggregation function $f$ defines the aggregation conditions [popularity $\geq 0.6$ (popular movies with a popularity threshold of 0.6)]. The item filter i specifies the item properties (genre=horror)

Aggregator-A 202 computes summary a1 by merging the ratings from user-B 182 and user-C 183 according to $f$. Aggregator-A 202 then applies item filter i to summary a1. Similarly, aggregator-B 204 computes summary a2 by merging the ratings from user-D 182 and user-C 183 according to $f$. Aggregator-B 204 then applies item filter i to summary a2.

Privacy Protection.

Data perturbation methods are used to protect user privacy while aggregating data of individual users. In an embodiment, noise is added to a user's data with a given perturbation probability. This process ensures that any adversaries cannot easily identify users, even based on other side-channel information (side-channel information refers to information acquired outside of the computer network; for example, side-channel information may be acquired by listening in on a user's conversation). Examples of an adversary include an aggregator trying to break the anonymity of users and an eavesdropper. Even when the raw perturbed data is acquired by adversaries, the process gives plausible deniability to users. For example, assume that user-B 182 perturbs his rating with 25% of probability. Most likely, one of his ratings would be changed when data is exported to the aggregator (assume that the rating of movie-B 112 is changed from Y to N). User-B 182 can deny that he rated any of the four movies, because nobody knows which particular rating was actually changed. Data perturbation is discussed in more detail below.

Progressive Sampling.

Since the number of users, groups, and items is typically large and dynamically growing, it is not viable to compute recommendations for every item by every user and every group by querying all the users in the community. In an embodiment, a sampling method splits a community into multiple disjoint sampling groups with exponentially decreasing sizes. A user can specify the sampling policy either by specifying the sampling rate (for example, one sample out of ten users equals a sampling rate of 1/10) or by imposing an accuracy level on the result. In the first method, the result is returned after gathering data from a specific sampling set. In the second method, called progressive sampling, polling starts from users of the smallest sampling group, and then moves on to users of the next bigger group until the required recommendation quality is achieved. An example of progressive sampling, using the concept of heavy hitters, is discussed below.

Algorithm Selection.

In an embodiment, a user may select the algorithm for computing popular items. Examples of algorithms include: (a) a simple summation of ratings; (b) a summation of ratings weighted by item similarity (that is, scores from users with similar ratings are more heavily weighted); and (c) a summation of ratings weighted by profile similarity (that is, scores from users with a similar profile are more heavily weighted).

There are design challenges and trade-offs in solving the distributed privacy-aware constrained data aggregation problem. For example, there is a trade-off between accuracy and performance. As discussed above, the numbers of users, items, and communities are large; therefore, efficiency in the generation of recommendations is an important factor. Consequently, there is a trade-off between recommendation accuracy and the performance achieved. Aggregation mechanisms that are both efficient and accurate are advantageous.

In the design of a recommendation system, there is also a trade-off between privacy risk and recommendation quality. Quality recommendations rely on accurate data provided by users. Users desire good recommendations, but also wish to minimize the risk of revealing private information. Statistical guarantees on the recommendation results with different privacy awareness levels are advantageous.

In an embodiment, the recommendation process is formulated as a case of distributed heavy hitter detection. A user has a binary rating b for each item. An algorithm determines whether an item is popular or not with a threshold $\rho$ among n users. Item i is heavy hitter (HH), when $$HH(i) = \left\{ i \mid \sum_{1 \leq i \leq n} b_i \geq \rho n \right\}.$$

In this instance, complete information from all the users is not available. An aggregation technique is used to detect heavy hitters even when data is perturbed; and a progressive sampling technique is used. The aggregation technique is summarized as follows. A user can perturb a rating bit b with probability $P_f$, resulting in a reported rating b'. A random variable X is defined as:

$$X = \begin{cases} -1 & Pr(\text{perturbed}) = P_f \\ 1 & Pr(\text{not perturbed}) = 1 - P_f \end{cases}.$$

A random variable S for sampling with probability $P_s$ is introduced as:

$$S = \begin{cases} 1 & Pr(\text{sampled}) = P_S \\ 0 & Pr(\text{not sampled}) = 1 - P_S \end{cases}.$$

To infer the sum of b using the sampled sum of b', a random variable Y is introduced as:

$$Y = \frac{1}{(1 - 2P_f)P_s} \sum_{1 \leq i \leq n} (2b'_i - 1).$$

To decide whether a specific item is a heavy hitter, a normal distribution is used to test whether Y exceeds the detection threshold $T = (2\rho - 1)n$.

The progressive sampling technique is summarized as follows. Testing is started with the smallest sampling group. Whether each item is a heavy hitter or not is tested using the observed popularity. The normal distribution test is run with a user-specified confidence level. Since all the items in a community are tested together, the decision whether to poll the next sampling group or not is based on the number of items classified as heavy hitters. In one embodiment, a sampling policy with two parameters is evaluated: C and F, where C is the minimum confidence level, and F is the fraction of items in the recommended list (for example, heavy hitters). That is, at least F fraction of items in the result satisfy a confidence level of C.

Simulation results for an embodiment are discussed below. Factors in the simulation include the behavior of users and recommendation calculations by aggregators. Aggregation accuracy, communication cost, and privacy risk of aggregation techniques are compared against a centralized system containing all available data (that is, an oracle).

Metrics used to characterize the accuracy of the recommendation system are the false positive (FP) rate and the false negative (FN) rate. The false positive rate refers to the number of falsely classified items as popular among all items, and the false negative rate refers to the number of items missing among popular items (when compared to an oracle). For the simulation, item purchase records from an on-line virtual society were acquired. The dataset contained 26,034 users, 6,617 items, and 214,660 purchases. An item purchase was considered as a user's preference, since no feedback data after the purchase was available. The goal of the simulation is to recommend virtual items by detecting popular ones (with detection threshold $\rho=50\%$) in a specific (user-defined) community. The community for each user is defined by k-Nearest Neighbor (kNN) using the Jaccard similarity. For a specific user, kNN refers to the k users with the highest Jacccard similarity with respect to the specific user. The result is the average of randomly selecting 10% of the communities.

Aggregation Accuracy.

Figure 3:
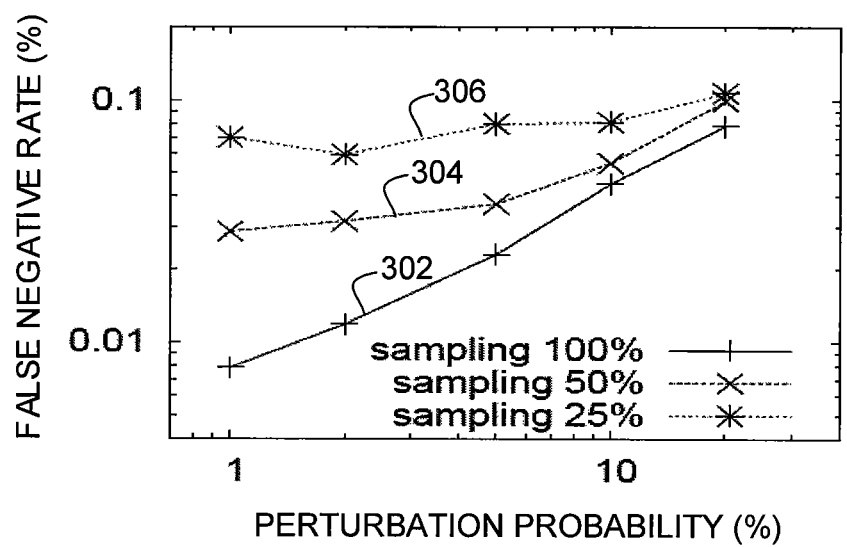
FIG. 3 shows plots of false negative rates as a function of perturbation probability.
Figure 4:
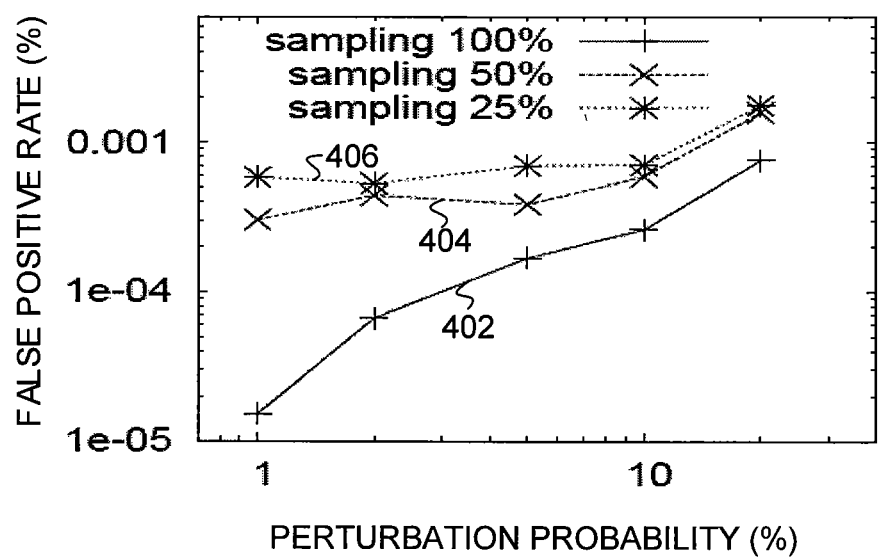
FIG. 4 shows plots of false positive rates as a function of perturbation probability.

FIG. 3 and FIG. 4 show plots of the accuracy of data perturbation as a function of the perturbation probability p (%). Each plot corresponds to a specific sampling rate with the detection criteria defined above. FIG. 3 shows plots of the false negative rate (%) as a function of p. Plot 302 corresponds to a sampling rate of 100%; plot 304 corresponds to a sampling rate of 50%; and plot 306 corresponds to a sampling rate of 25%. FIG. 4 shows plots of the false positive rate (%) as a function of p. Plot 402 corresponds to a sampling rate of 100%; plot 404 corresponds to a sampling rate of 50%; and plot 406 corresponds to a sampling rate of 25%. As the probability p increases, the error rate also increases. However, the false negative rate is less than 0.1%, and the false positive rate is less than 0.001%, even for p as high as 10%.

Communication Cost.

The communication cost of the progressive sampling technique was evaluated for two sample policies:

Policy1 (C=0.75, F=1). All decisions have to be made with at least 75% confidence level.

Policy2 (C=0.75, F=0.5). At least half of the recommendations have to be made with at least 75% confidence level.

The minimum number of users in the smallest sampling group is set as 10, and the sampling rate is increased until the observed result satisfies the corresponding requirement.

FIG. 6 summarizes the results of the progressive sampling technique. In FIG. 6, column reference numbers are enclosed in ( ) to avoid confusion with numeric table entries. Column (602) lists kNN communities of two different sizes (k=100 or 1000). Column (604) lists the policy (policy1 or policy2). Column (606) lists the average FN rate. Column (608) lists the average FP rate. Column (610) lists the average number of users contacted with progressive sampling. Column (612)-column (624) list the fraction of communities which end up using the corresponding sampling rate of 1.5%, 3%, 6%, 12%, 25%, 50%, and 100%, respectively. In particular, 52.3% of communities stopped at 12% sampling rate with policy1; whereas 7.2% of them reached the entire population with a 100% sampling rate. By requiring all items with 75% confidence level, policy1 achieves a lower FN than that of policy 2. On the other hand, policy 1 reaches a larger set of samples to meet the stricter requirement on the confidence of the recommendations, thereby incurring the higher cost in network and computing resources. For example, almost 3 out of 4 times, policy 2 receives satisfactory answers from a 12% sampling rate, whereas policy1 could not be satisfied with a 12% sampling rate about half of the time.

Privacy Risk Analysis Identification Attack.

Figure 5:
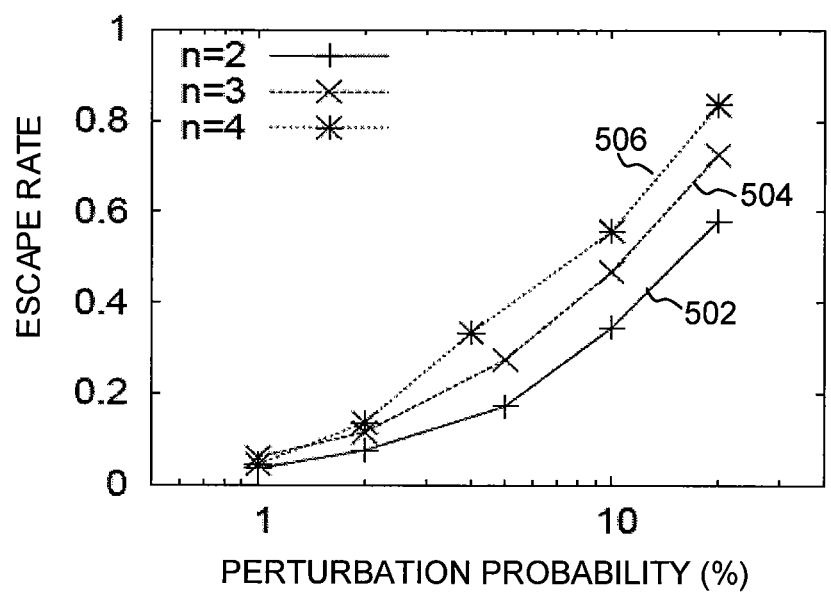
FIG. 5 shows plots of escape rates as a function of perturbation probability.

To evaluate privacy risk, it was assumed that an attacker knows a number of ratings, n, by a victim through a side-channel. The attacker's goal is to identify all the ratings in the victim's interest profile. Since traffic is not encrypted between users and aggregators, it is also assumed that the attacker is able to monitor all the traffic between them (a conservative assumption). The attacker tries to narrow down the set of possible users (for example, candidate set) by cross-checking monitored traffic and his knowledge. FIG. 5 shows the effectiveness of the identification attack with respect to the perturbation probability p, when the attacker knows n items from the victim's profile. The plots in FIG. 5 show the escape rate as a function of p for different values of n. Escape rate refers to the fraction of users not included in the attacker's candidate set after data perturbation. Plot 502 corresponds to n=2; plot 504 corresponds to n=3; and plot 506 corresponds to n=4. The data perturbation technique helps users escape from being identified (that is, from being included in the candidate set the attacker built), especially when n is large.

In an embodiment, the recommendation system is implemented with sketch-based data structures. A sketch has a sum over a random subset of the original data. The count of the original data can be reconstructed from the sketch. When the sketch is stored in memory, the memory space is saved (reduced). When the sketch is transmitted to another place through the network, the communication cost is saved (reduced). Sketch-based data structures are advantageous because they hide rating data, they merge multiple data structures easily, and they are space-efficient (low memory requirement). As discussed above, an item rating is represented as a bit. A bloom filter is used to store item ratings of an individual user. Each user maintains a bloom filter for a specific interval of time. When a user rates an item, the user agent computes hash values of the itemID (identifier of an item) and turns on the corresponding bit positions of the bloom filter. By using the bloom filter, it is difficult for adversaries to infer itemIDs which the user rated, since reverse mapping of a bloom filter is difficult. Note that the bloom filter introduces small false positives and zero false negatives.

In another embodiment, a multi-stage filter is used. When aggregators merge ratings of multiple users, it stores the popularity of items into a multi-stage filter. Specifically, an aggregator instantiates one multi-stage filter per item to maintain popularity (for example, the number of users who rated the item). Aggregators maintain the list of itemIDs in the interval, too. When merging ratings of users (stored in bloom filters), a multi-stage filter stores hash values of the userIDs (identifier of a user) who rated the corresponding item. The advantage of maintaining the entire membership (instead of user counts) is that bit-wise OR operation for multiple aggregators may be performed. Referring again to the example discussed in FIG. 1A and FIG. 1B, when the item popularity p1 from AUS (movie-A) and the item popularity p2 from AUS (movie-C) are known, the item popularity of AUS (movie-A OR movie-C) cannot be determined without knowing the item popularity from AUS (movie-A AND movie-C). By using summary data structures, the conjunction of two AUS does not need to be known to calculate the item popularity of two overlapping AUS. Similar to the bloom filter case, reverse mapping of the multi-stage filter is also difficult.

Figure 7:
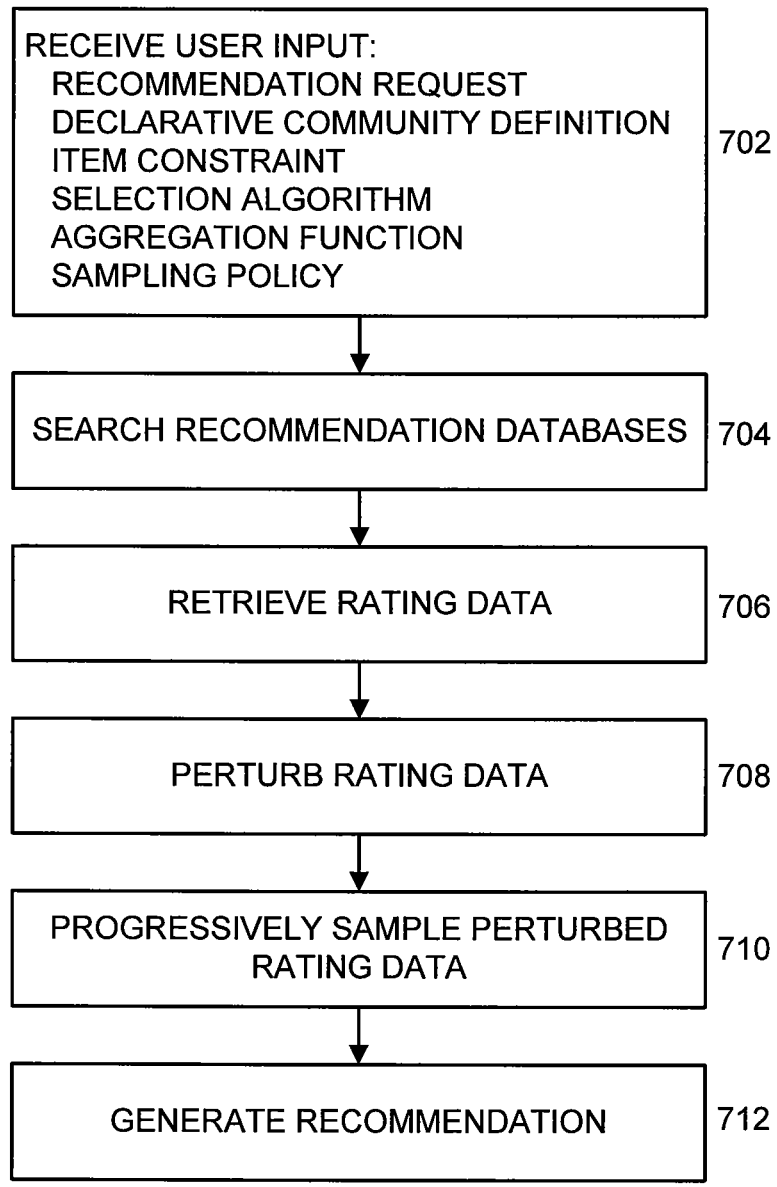
FIG. 7 shows a flowchart of steps for a recommendation process.

FIG. 7 shows a flowchart of steps for generating a recommendation. In step 702, a recommendation system receives a set of user-defined (user-specified) input (also referred to simply as user input). The set of user input includes various elements, such as the recommendation request (query), declarative community definition, item constraint, selection algorithm, aggregation function, and sampling policy. Note that not all of the elements shown in step 702 need to be specified by the user; for example, the recommendation system may have default values. The user may also specify other elements in addition to those listed in step 702.

The process then passes to step 704, in which the recommendation system searches recommendation databases for rating data. Recommendation databases, for example, include databases accessed via websites on the Internet. Databases may be maintained, for example, by on-line merchants and on-line social networks. Databases may also be maintained by providers of multimedia services or content; for example, by merchants who rent out DVDs, providers of video-on-demand over cable, providers of music and video downloads over the Internet, and providers of streaming multimedia over the Internet. In some embodiments, databases may include private databases (for example, restricted access or password protected). Rating data includes information on the items being rated and information on the users providing the ratings. User information may be presented as user profiles, containing information such as location, age, ethnicity, occupation, marital status, and education level.

The process then passes to step 706, in which the recommendation system retrieves rating data based on the user input received in step 702. The process then passes to step 708, in which the rating data is perturbed to preserve privacy. The process then passes to step 710, in which the perturbed rating data is progressively sampled. The process then passes to step 712, in which a recommendation (or set of recommendations) is generated.

Figure 8:
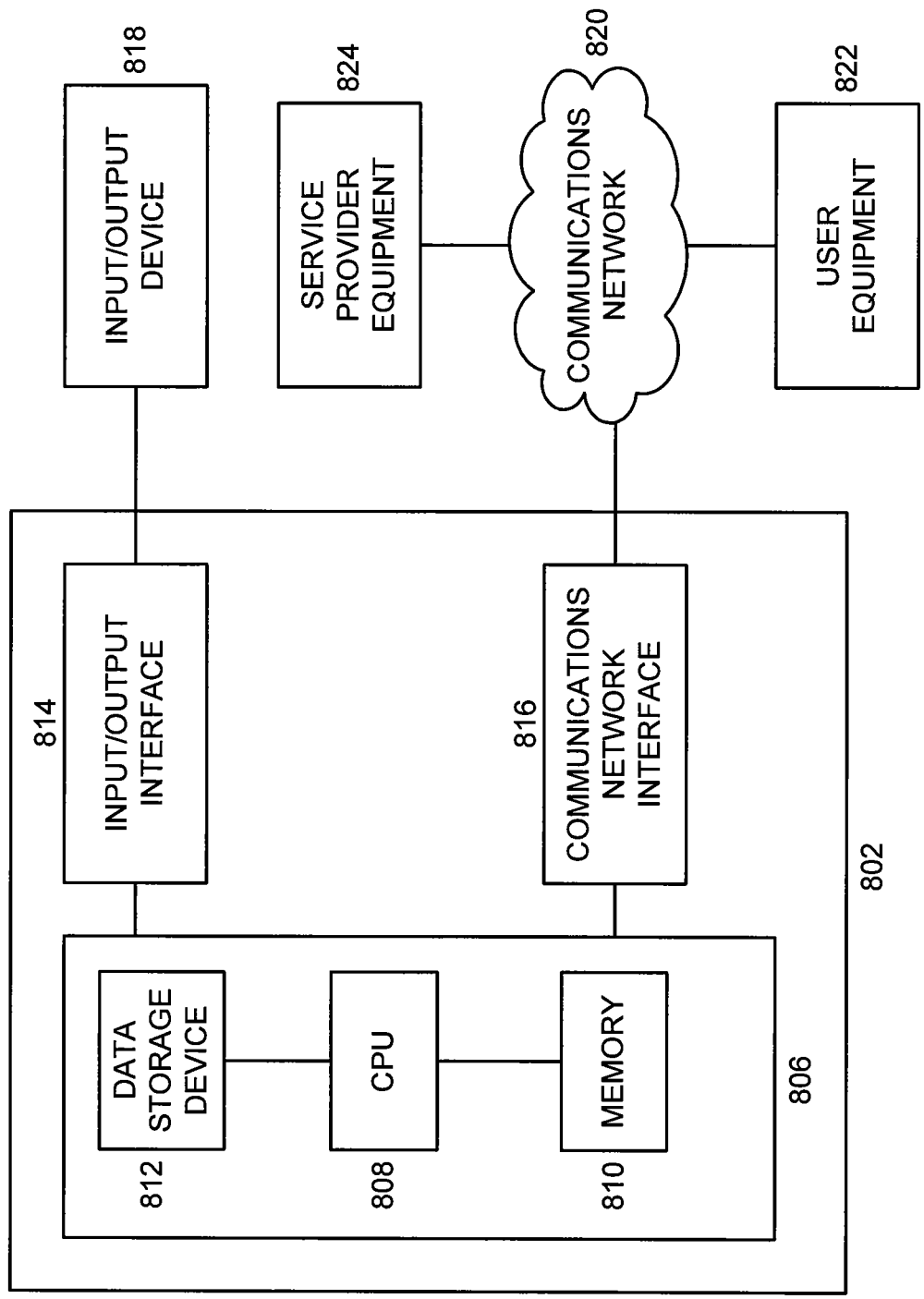
FIG. 8 shows a schematic of a computational system for implementing a recommendation system.

An embodiment of a computational system for implementing a recommendation system is shown in FIG. 8. One example of computational system 802 is a network server. One skilled in the art may construct the computational system 802 from various combinations of hardware, firmware, and software. One skilled in the art may construct the computational system 802 from various electronic components, including one or more general purpose microprocessors, one or more digital signal processors, one or more application-specific integrated circuits (ASICs), and one or more field-programmable gate arrays (FPGAs).

Computational system 802 comprises computer 806, which includes a central processing unit (CPU) 808, memory 810, and data storage device 812. Data storage device 812 comprises at least one persistent, tangible computer readable medium, such as non-volatile semiconductor memory, a magnetic hard drive, and a compact disc read only memory.

Computational system 802 may further comprise user input/output interface 814, which interfaces computer 806 to user input/output device 818. Examples of input/output device 818 include a keyboard, a mouse, and a local access terminal. Data, including computer executable code, may be transferred to and from computer 806 via input/output interface 814.

Computational system 802 may further comprise communications network interface 816, which interfaces computer 806 with communications network 820. Examples of communications network 820 include a local area network and a wide area network. Communications network 820 may comprise a wireless network. Data, including computer executable code, may be transferred to and from computer 806 via communications network interface 816. A user may access computer 806 via user equipment 822 which communicates with communications network 820. Examples of user equipment 822 include a personal computer, a laptop computer, a personal digital assistant, and a cell phone. A service provider (such as the one providing the recommendation system) may access computer 806 via service provider equipment 824 which communicates with communications network 820. Examples of service provider equipment 824 include a personal computer, a workstation, and a server.

As is well known, a computer operates under control of computer software, which defines the overall operation of the computer and applications. CPU 808 controls the overall operation of the computer and applications by executing computer program instructions that define the overall operation and applications. The computer program instructions may be stored in data storage device 812 and loaded into memory 810 when execution of the program instructions is desired. The method steps shown in the flowchart in FIG. 7 may be defined by computer program instructions stored in the memory 810 or in the data storage device 812 (or in a combination of memory 810 and data storage device 812) and controlled by the CPU 808 executing the computer program instructions. For example, the computer program instructions may be implemented as computer executable code programmed by one skilled in the art to perform algorithms implementing the method steps shown in the flowchart in FIG. 7. Accordingly, by executing the computer program instructions, the CPU 808 executes algorithms implementing the method steps shown in the flowchart in FIG. 7.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method for generating a recommendation, the method comprising:
   selecting a plurality of members from a user defined community;
   retrieving a rating for a particular interest from each of the plurality of members, the particular interest based on a user-defined recommendation request;
   generating a respective perturbed rating for each rating from the plurality of members such that there is a predetermined probability that each rating is different from its respective perturbed rating;
   aggregating each of the perturbed ratings to generate an aggregated perturbed rating; and
   generating the recommendation based on the aggregated perturbed rating.

2. The method of claim 1, further comprising:
   receiving a user-defined item constraint; and
   generating the recommendation based on the user-defined item constraint.

3. The method of claim 1, wherein the user defined community is defined based on a user defined declarative community definition comprising a predicate on user attributes.

4. The method of claim 1, further comprising:
   receiving a user defined recommendation request issued by a user as a user query, the recommendation generated in response to receiving the user-defined recommendation request.

5. The method of claim 1, wherein:
   the community is split into a plurality of disjoint sampling groups;
   each particular disjoint sampling group in the plurality of disjoint sampling groups has a particular size;
   the particular sizes decrease exponentially from a first size to a second size; and
   the plurality of members selected from the disjoint sampling group with the smallest size such that an accuracy level of the plurality of perturbed rating data is greater than or equal to a user-defined accuracy level.

6. The method of claim 1, wherein selecting the plurality of members comprises:
   splitting the community into a plurality of disjoint sampling groups, wherein each particular disjoint sampling group in the plurality of disjoint sampling groups has a particular size, and wherein the particular sizes decrease exponentially from a largest size to a smallest size; and
   selecting the plurality of members from a particular disjoint sampling group based on a user-defined sampling rate.

7. The method of claim 1, further comprising:
   receiving a user defined recommendation algorithm; and
   generating the recommendation based on the user defined recommendation algorithm.

8. An apparatus for generating a recommendation, the apparatus comprising:
   a processor; and
   a memory to store computer program instructions, the computer program instructions when executed on the processor cause the processor to perform operations comprising:
   selecting a plurality of members from a user defined community;

retrieving a rating for a particular interest from each of the plurality of members, the particular interest based on a user-defined recommendation request;

generating a respective perturbed rating for each rating from the plurality of members such that there is a pre-determined probability that each rating is different from its respective perturbed rating;

aggregating each of the perturbed ratings to generate an aggregated perturbed rating; and generating the recommendation based on the aggregated perturbed rating.

9. The apparatus of claim 8, the operations further comprising:

receiving a user-defined item constraint; and generating the recommendation based on the user-defined item constraint.

10. The apparatus of claim 8, wherein the user defined community is defined based on a user defined declarative community definition comprising a predicate on user attributes.

11. The apparatus of claim 8, the operations further comprising:

receiving a user defined recommendation request issued by a user as a user query, the recommendation generated in response to receiving the user-defined recommendation request.

12. The apparatus of claim 8, wherein:

the community is split into a plurality of disjoint sampling groups;

each particular disjoint sampling group in the plurality of disjoint sampling groups has a particular size;

the particular sizes decrease exponentially from a first size to a second size; and the plurality of members selected from the disjoint sampling group with the smallest size such that an accuracy level of the plurality of perturbed rating data is greater than or equal to a user-defined accuracy level.

13. The apparatus of claim 8, wherein selecting the plurality of members comprises:

splitting the community into a plurality of disjoint sampling groups, wherein each particular disjoint sampling group in the plurality of disjoint sampling groups has a particular size, and wherein the particular sizes decrease exponentially from a largest size to a smallest size; and selecting the plurality of members from a particular disjoint sampling group based on a user-defined sampling rate.

14. The apparatus of claim 8, the operations further comprising:

receiving a user defined recommendation algorithm; and generating the recommendation based on the user defined recommendation algorithm.

15. A non-transitory computer readable medium storing computer program instructions for generating a recommendation, which, when executed on a processor, cause the processor to perform operations comprising:

selecting a plurality of members from a user defined community;

retrieving a rating for a particular interest from each of the plurality of members, the particular interest based on a user-defined recommendation request;

generating a respective perturbed rating for each rating from the plurality of members such that there is a pre-determined probability that each rating is different from its respective perturbed rating;

aggregating each of the perturbed ratings to generate an aggregated perturbed rating; and generating the recommendation based on the aggregated perturbed rating.

16. The non-transitory computer readable medium of claim 15, the operations further comprising:

receiving a user-defined item constraint; and generating the recommendation based on the user-defined item constraint.

17. The non-transitory computer readable medium of claim 15, wherein the user defined community is defined based on a user defined declarative community definition comprising a predicate on user attributes.

18. The non-transitory computer readable medium of claim 15, the operations further comprising:

receiving a user defined recommendation request issued by a user as a user query, the recommendation generated in response to receiving the user-defined recommendation request.

19. The non-transitory computer readable medium of claim 15, wherein:

the community is split into a plurality of disjoint sampling groups;

each particular disjoint sampling group in the plurality of disjoint sampling groups has a particular size;

the particular sizes decrease exponentially from a first size to a second size; and the plurality of members selected from the disjoint sampling group with the smallest size such that an accuracy level of the plurality of perturbed rating data is greater than or equal to a user-defined accuracy level.

20. The non-transitory computer readable medium of claim 15, wherein selecting the plurality of members comprises:

splitting the community into a plurality of disjoint sampling groups, wherein each particular disjoint sampling group in the plurality of disjoint sampling groups has a particular size, and wherein the particular sizes decrease exponentially from a largest size to a smallest size; and selecting the plurality of members from a particular disjoint sampling group based on a user-defined sampling rate.

* * * * *